(12) United States Patent
Chang et al.

(10) Patent No.: US 11,588,189 B2
(45) Date of Patent: Feb. 21, 2023

(54) BATTERY CONTROL METHOD

(71) Applicants: Changs Ascending Enterprise Co., Ltd., Taichung (TW); Chun-Chieh Chang, Taichung (TW)

(72) Inventors: Chun-Chieh Chang, Ithaca, NY (US); Olivia Pei Hua Lee, Ithaca, NY (US); Tsun Yu Chang, Taichung (TW); Yu-Ta Tseng, Taipei (TW)

(73) Assignees: CHANGS ASCENDING ENTERPRISE CO., LTD., Taichung (TW); Chun-Chieh Chang, Taichung (TW)

( * ) Notice: Subject to any disclaimer, the term of this patent is extended or adjusted under 35 U.S.C. 154(b) by 0 days.

(21) Appl. No.: 16/908,943

(22) Filed: Jun. 23, 2020

(65) Prior Publication Data

US 2020/0321664 A1  Oct. 8, 2020

Related U.S. Application Data

(62) Division of application No. 15/865,049, filed on Jan. 8, 2018, now Pat. No. 10,727,543.

(51) Int. Cl.

| H01M 10/42 | (2006.01) |
| H01M 10/46 | (2006.01) |
| H01M 10/48 | (2006.01) |
| H01M 10/0525 | (2010.01) |
| H02J 7/00 | (2006.01) |

(52) U.S. Cl.
CPC ... *H01M 10/4257* (2013.01); *H01M 10/0525* (2013.01); *H01M 10/425* (2013.01); *H01M 10/4207* (2013.01); *H01M 10/46* (2013.01); *H01M 10/482* (2013.01); *H02J 7/0014* (2013.01); *H01M 2010/4271* (2013.01); *H01M 2220/20* (2013.01)

(58) Field of Classification Search
CPC .. H01M 10/42; H01M 10/0525; H01M 10/46; H01M 10/48
See application file for complete search history.

(56) References Cited

U.S. PATENT DOCUMENTS

| 2,948,843 A | 8/1960 | Klein |
| 3,111,653 A | 11/1963 | Massell et al. |
| (Continued) | | |

FOREIGN PATENT DOCUMENTS

| JP | 2000-69689 A | 3/2000 |
| JP | 2002-58170 A | 2/2002 |
| (Continued) | | |

OTHER PUBLICATIONS

International Search Report and Written Opinion dated Mar. 15, 2019, issued in application No. PCT/US19/12469.

(Continued)

*Primary Examiner* — Kenneth J Douyette
(74) *Attorney, Agent, or Firm* — McClure, Qualey & Rodack, LLP (57) ABSTRACT

In one embodiment, a system comprising a battery set comprising plural battery cells configured in a circuit; and a control system configured to switch current flow in the circuit from bi-directional flow to and from the battery set to mono-directional flow to or from the battery set based on an over-charging or over-discharging condition.

10 Claims, 5 Drawing Sheets

(56) References Cited

U.S. PATENT DOCUMENTS

| | | | |
|---|---|---|---|
| 4,647,721 A | 3/1987 | Busam et al. | |
| 5,656,915 A * | 8/1997 | Eaves | H02J 7/0014 |
| | | | 320/118 |
| 5,883,495 A | 3/1999 | Smith et al. | |
| 7,091,770 B2 | 8/2006 | Schlaffer | |
| 7,494,744 B2 | 2/2009 | Chang | |
| 7,579,811 B2 | 8/2009 | Sato et al. | |
| 7,585,593 B2 | 9/2009 | Chang | |
| 7,629,084 B2 | 12/2009 | Chang | |
| 7,718,320 B2 | 5/2010 | Chang | |
| 7,777,451 B2 | 8/2010 | Chang et al. | |
| 7,782,013 B2 | 8/2010 | Chang | |
| 7,808,207 B1 | 10/2010 | Chang | |
| 7,821,231 B1 | 10/2010 | Chang et al. | |
| 7,825,632 B1 | 11/2010 | Chang | |
| 8,159,191 B2 | 4/2012 | Chang et al. | |
| 8,217,625 B2 | 7/2012 | Chang et al. | |
| 8,354,811 B2 | 1/2013 | Gollentz | |
| 8,390,243 B2 | 3/2013 | Wu et al. | |
| 8,610,405 B2 | 12/2013 | Yamazaki et al. | |
| 8,896,268 B2 | 11/2014 | Sakurai et al. | |
| 10,516,276 B2 | 12/2019 | Yamauchi et al. | |
| 2002/0057542 A1* | 5/2002 | Colling | B60K 28/14 |
| | | | 361/52 |
| 2008/0226969 A1 | 9/2008 | Fattig | |
| 2012/0139491 A1 | 6/2012 | Eberhard et al. | |
| 2013/0202918 A1 | 8/2013 | Kimura | |

FOREIGN PATENT DOCUMENTS

| | | |
|---|---|---|
| JP | 2003-87987 A | 3/2003 |
| JP | 2005-151696 A | 6/2005 |
| JP | 2008-54412 A | 3/2008 |
| JP | 2012-210137 A | 10/2012 |
| JP | 6241559 B1 | 12/2017 |
| TW | 201220637 A | 5/2012 |
| TW | 201714379 A | 4/2017 |

OTHER PUBLICATIONS

European Search Report dated Sep. 10, 2021, issued in application No. EP19735792.4.
Japanese language office action dated Nov. 2, 2021, issued in application No. JP 2020-557127.
English language translation of office action dated Nov. 2, 2021, issued in application No. JP 2020-557127.
Japanese language office action dated Jun. 7, 2022, issued in application No. JP 2020-557127.
English language translation of office action dated Jun. 7, 2022, issued in application No. JP 2020-557127.
Chinese language office action dated Jun. 21, 2022, issued in application No. TW 108100674.
English language translation of Search Report included with Chinese language office action dated Jun. 21, 2022, issued in application No. TW 108100674 (p. 4 of attachment).
Indian language Examination Report dated Jun. 20, 2022, issued in application No. IN 202017033399 (translation included).

* cited by examiner

BATTERY CONTROL METHOD

CROSS REFERENCE TO RELATED APPLICATIONS

This application is a Divisional of U.S. application Ser. No. 15/865,049, filed on Jan. 8, 2018, now U.S. Pat. No. 10,727,543. The disclosure of the prior application is hereby incorporated herein in the entirety by reference.

TECHNICAL FIELD

The present disclosure is generally related to battery systems, and in particular, lithium-based battery systems.

BACKGROUND

Electric bikes, electric motorcycles, electric vehicles, electric forklifts, energy storage systems (ESS), and uninterrupted power supplies (UPS) that require battery energy as the power sources are attracting more attention and are becoming more popular in recent years. Conventionally, Lead Acid Batteries are used in the above mentioned applications. Although Lead Acid Batteries have a long in history and are low in cost, the harmful nature of lead, low energy density, and short cycle life have made Lead Acid Batteries unsatisfactory to the environment and/or application demands of today. Earlier breakthroughs in materials using Lithium Ferrous Phosphorous Oxide (LFPO) as the cathode material (see, e.g., U.S. Pat. Nos. 7,494,744, 7,585,593, 7,629,084, and 7,718320, all incorporated herein by reference in their entirety), battery balancing systems (see, e.g., U.S. Pat. Nos. 7,782,013, 7,808,207, and 7,825,632, all incorporated herein by reference in their entirety), and battery system control/operation (see, e.g., U.S. Pat. Nos. 7,777,451, 8,217,625, 7,821,231, and 8,159,191, all incorporated herein by reference in their entirety) have successfully demonstrated the superiority of LFPO battery systems over existing Lead Acid Battery systems. However, determining how to design LFPO battery modules that are ready to replace existing Lead Acid Batteries, and even the resulting battery systems, are still challenging to date. Ideally, direct replacement of battery modules (e.g., take out the Lead Acid Batteries and directly swap in the LFPO Battery modules) is desirable. However, communications to the devices' control interface and/or adjustment of working parameters (e.g., charging parameters, cut-off parameters, etc.) to the devices' controls are needed. Taking UPS applications as an example, there is no simple LFPO battery solution for the UPS if the user wishes to upgrade the Lead Acid Batteries to the LFPO Batteries.

SUMMARY OF THE INVENTION

In one embodiment, a system comprising: a battery set comprising plural battery cells configured in a circuit; and a control system configured to switch current flow in the circuit from bi-directional flow to and from the battery set to mono-directional flow to or from the battery set based on an over-charging or over-discharging condition.

These and other aspects of the invention will be apparent from and elucidated with reference to the embodiment(s) described hereinafter.

BRIEF DESCRIPTION OF THE DRAWINGS

Many aspects of certain embodiments of a battery module system can be better understood with reference to the following drawings. The components in the drawings are not necessarily to scale, emphasis instead being placed upon clearly illustrating the principles of the battery module system and methods. Moreover, in the drawings, like reference numerals designate corresponding parts throughout the several views.

DESCRIPTION OF EXAMPLE EMBODIMENTS

Certain embodiments of a battery module system and method are disclosed that include a mechanism to enable mono-directional current flow into or out of a lithium-ion based battery set during an over-charge or over-discharge condition. In one embodiment, a battery module system comprises a circuit that comprises the battery set having plural (e.g., series-connected, though not limited as such) battery cells and a control system that switches current flow between bi-directional flow to and from the battery set and mono-directional flow to or from the battery set based on detection of the over-charge or over-discharge condition. By doing so, the lithium-ion based battery cells (e.g., Lithium Ferrous Phosphorous Oxide or LFPO battery cells, among others) are configured as suitable for replacing Lead Acid Batteries for the reasons set forth below.

Digressing briefly, and using LFPO battery modules as an example, prevention of over charging (OC), over discharging (OD), and battery cell balancing are important in making a working battery module, as disclosed in U.S. Pat. No. 8,159,191, Examples 7 and 8. Although such systems as disclosed in the patents referenced herein work well, when any of the battery modules (e.g., connected in series) triggers an OC or OD condition, such battery systems shut down (owing to the open circuit condition). Nonetheless, the reliance of charger control (on/off) in making the battery modules balanced over time limits the compatibility of the battery modules being implemented in any of the existing devices currently using Lead Acid Batteries, owing to the differences in end-of-charge voltage and the floating voltage of a charger used in such applications. In contrast, certain embodiments of a battery module system make the LFPO battery modules (or other lithium-ion based battery modules) not only suitable for any existing devices, but also ready for replacing the existing Lead Acid Batteries.

Having summarized certain features of a battery module system of the present disclosure, reference will now be made in detail to the description of a battery module system as illustrated in the drawings. While a battery module system will be described in connection with these drawings, there is no intent to limit it to the embodiment or embodiments disclosed herein. For instance, though emphasis is placed on LFPO battery cells technology, the battery module system described herein is applicable and/or can be extended to all other lithium-ion based battery cells, including Lithium Iron Phosphate batteries (LFP), Nickel Manganese Cobalt batteries (NMC), Nickel Cobalt Aluminum batteries (NCA), Lithium Cobalt Oxide Batteries (LCO), among others as would be understood by one having ordinary skill in the art. For simplicity and to avoid obfuscating various features of a battery module system, LFPO battery and LFPO battery modules/cells are used herein as an illustration of one type of lithium-ion based technology, though not be limited to the use of only LFPO batteries. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Figure 1:
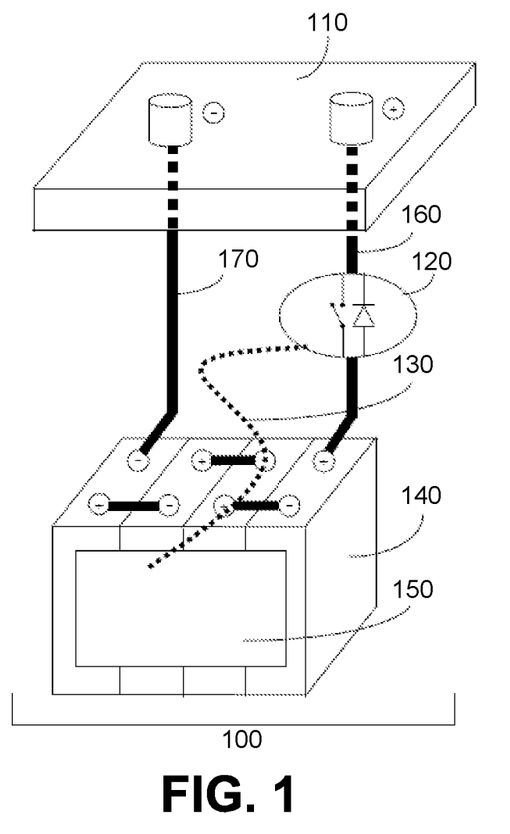
FIG. 1 is a schematic diagram that illustrates an embodiment of an example battery module system.

As described below, certain embodiments of a battery module system may comprise OC/OD control, an optional battery cell balancer, and a control system that enables mono-directional current flow out of the battery module after the battery module performs over charge (OC) cut-off activity. The control system may also be referred to as a mono-directional current flow controller. Referring now to FIG. 1, shown is a battery module system or battery module 100 that comprises the three major functions summarized above. Note that the terms battery module system and battery module refer herein to the same system 100, and hence are used interchangeably. In the depicted embodiment, four battery cells are connected in series as a battery cell set 140, though it should be appreciated by one having ordinary skill in the art that other (plural) quantities of battery cells may be used in some embodiments, with the depicted quantity merely for illustration. Further, though described herein primarily as plural cells arranged in series, it should be appreciated by one having ordinary skill in the art in the context of the present disclosure that the battery cell set 140 (or other battery cell sets described herein) may be configured as a plurality of battery cells connected in parallel, in series, in parallel-series, or in series-parallel, as described in U.S. Pat. No. 8,159,191 or '191 patent (see, e.g., page 36, column 11, lines 48-57), the '191 patent incorporated herein by reference in its entirety. The battery cell set 140 is connected in the circuit shown to a battery module top 110 through a positive cable connection 160 and a negative cable connection 170. Disposed on (e.g., the side) of battery cell set 140 is a printed circuit board (PCB) 150 possessing OC/OD detection circuitry and/or cell balance circuitry (individually, or collectively, referred to also as control circuitry). With regard to the OC/OD circuitry, further information may be found in the '191 patent (see, e.g., page 36, column 12, lines 22-51). For instance, the OC/OD circuitry is configured to control one or more channels concurrently. When an over-charge condition is met for a cell (e.g., 4.0 V), a pulse is sent to a relay (usually an electromagnetic latching relay) that terminates the current input from charger for the prevention of over-charging the cell. In the case for high voltage applications such as plug-in hybrid vehicle that operates at 300 V or more, instead of using a relay for immediate termination of charging activity, the over-charge signal is sent to the vehicle ECU (electronic control unit) for terminating the charging activity for the prevention of damaging other electrical devices on board such as a motor or a genset. An important feature of the over-charge control is an "automatic resume" function of the relay. A typical example is an IC that controls eight channels simultaneously: When an over-charge condition is met for one of the cells, a pulse is sent to a relay (usually an electromagnetic latching relay) that terminates the current input from charger for the prevention of over-charging the cell. The charging is resumed when "all" cell voltages drop to a preset voltage. This means a charging activity is resumed when "all" cell voltages below to a preset voltage. This typical voltage could be 3.4 V for the case of lithium iron phosphorous oxide or other $LiFePO_4$ type of cells.

When an OC (or OD) condition is reached, a control system 120 is triggered by a signal from the PCB 150 (e.g., the OC/OD circuitry) through a connection cable 130. In one embodiment, the control system 120 comprises a relay and a diode that is connected in parallel to the relay. The control system 120 can be placed on the positive side of the battery 160, the negative side of the battery 170, or on both sides. Since the control system 120 controls only OC or OD conditions separately, owing to the use of a diode, the control system 120 for OC conditions is also referred to as an OC apparatus 120A, and the control system 120 for OD conditions is also referred to as an OD apparatus 120B.

Figure 2A:
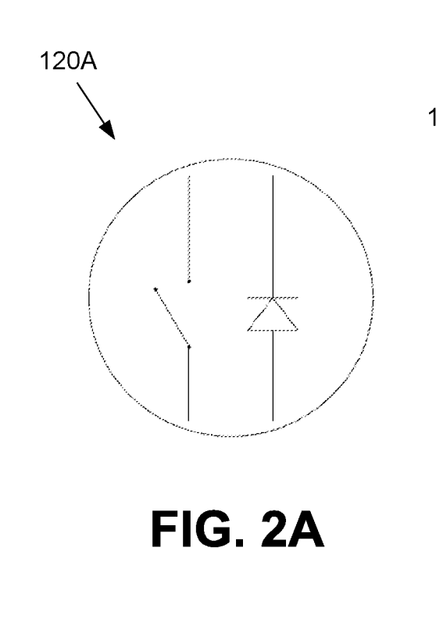
FIGS. 2A-2C are schematic diagrams that illustrate various example control systems for the battery module system of FIG. 1.
Figure 2B:
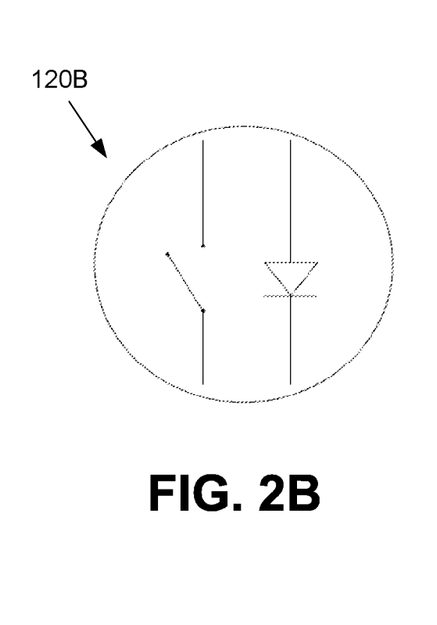
Figure 2C:
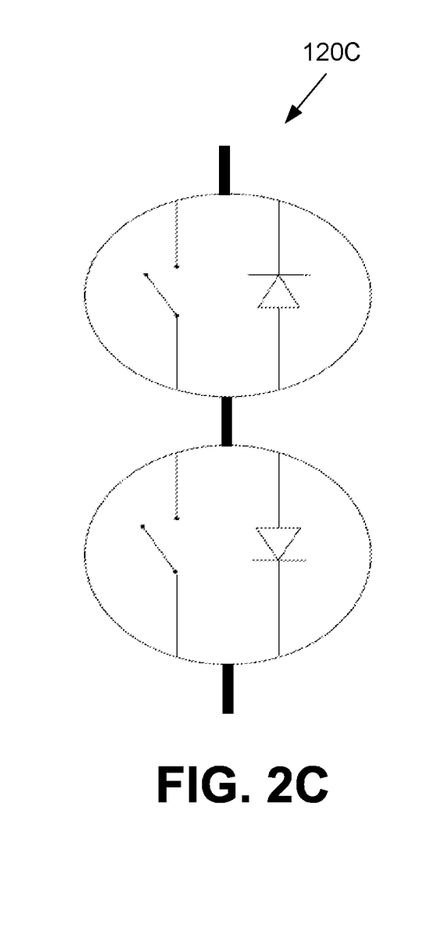

FIG. 2A shows the OC apparatus 120A used for the battery module 100. FIG. 2B shows the OD apparatus 120B used for the battery module 100 using the same components operated in FIG. 2A, except the direction of the diode is opposite. FIG. 2C shows the control system 120 configured for both OC and OD apparatuses (i.e., both incorporated in the same battery module), and is denoted as control system 120C. Referring to FIGS. 1-2A, during OC conditions, when the relay of the OC apparatus 120A opens, charging current (e.g., from a charging device, not shown) is stopped owing to the presence of the diode. At this instance, the discharge function of the battery module 100 is still active, which prevents the battery module 100 from exhibiting a "shutdown" phenomena (i.e., zero voltage). If an external load is provided, the battery cell set 140 starts to discharge during the duration of OC conditions, and the discharge current can flow through the diode, thus resulting in a voltage drop across the battery cells. Eventually when OC conditions are ended (e.g., when cell voltages, as a whole, or individually, or a combined use are back within a normal or predetermined working range), the relay of the OC apparatus 120A closes and the battery (battery cell set 140) is performing normally again, enabling current flow through the circuit and into and out of the battery cell set 140 (i.e., bi-directionally) through the relay of the OC apparatus 120A.

Similar to the working principle of the OC apparatus 120A described above in association with FIG. 2A, the OD apparatus 120B (shown in FIG. 2B) works when OD conditions are triggered. Referring to FIGS. 1 and 2B, during the OD conditions, the relay of the OD apparatus 120B is opened and the diode of the OD apparatus 120B only enables a charging current rather than a discharging current. When an external charging current (e.g., from a charging device, not shown) is available, the current is flowing through the diode of the OD apparatus 120B, thus resulting in a battery cell voltage rise for the battery cell set 140. Eventually, when OD conditions are ended (e.g., when cell voltages, as a whole or individually, or a combined use are back within a normal or predetermined working range), the relay of the OD apparatus 120B closes and the battery (battery cell set 140) is performing normally again, enabling current flowing into and out of the battery cell set 140 (e.g., bi-directionally) through the relay of the OD apparatus 120B.

As indicated above, the OC apparatus and the OD apparatus can be integrated into the same battery module, as shown by the control system 120C of FIG. 2C. During the OC conditions, the relay of the OC apparatus is open while the relay of the OD apparatus is closed. Likewise, during the OD conditions, the relay of the OD apparatus is open while the relay of the OC apparatus is closed.

Referring again to FIGS. 1-2A, during OC conditions, when the relay of the OC apparatus 120A opens, the charging current is stopped, owing to the presence of the diode. At this instance, the discharge function of the battery module 100 is still active, which prevents the battery module 100 from exhibiting the "shut-down" phenomena (zero voltage), as explained above. However, unlike the previous description, if no external load is present to enable a voltage drop, there is a second mechanism that still enables the battery cell voltage drop, and it is referred to herein as a balancing function. As disclosed in U.S. Pat. Nos. 7,782,013, 7,808,207, and 7,825,632 referenced above and incorporated herein by reference in their entirety, cell balance is performed on each battery cell connected in series. When the voltage of any battery cell exceeds a preset voltage, a self-discharge of the battery cell (e.g., through a resistor connected in parallel with the battery cell) is performed, and the self-discharge activity ends either when another preset voltage is reached, or a pre-determined time period condition is met (e.g., see the '191 patent referenced above, col. 12, lines 22-51, such as through use of voltage monitoring and time count-down in an IC at the PCB 150). As a result, during the OC conditions, if no external load is present to enable a voltage drop, the balancing function in certain embodiments of a battery module system lowers the voltages of each of the battery cells. Eventually, when cell voltages are back within the normal or predetermined working range (and hence the OC condition ends), the relay of the OC apparatus 120A closes and the battery module performs normally, enabling charging activity to be resumed. The resumption in charging activity is thus observed, and referred to herein also as battery module controlled intermittent charging behavior. Several merits of the intermittent charging behavior are described below.

The "never shut down" feature of the battery module 100 is important for electric vehicle (EV), light electric vehicle (LEV), and UPS applications. Taking an EV application as an example, if an un-noticed shut down caused by an OC condition during a regenerative breaking process occurs, the vehicle may stop suddenly, which may lead to safety problems. Also, for UPS applications, if one of the battery modules shuts down, as caused by an OC condition triggered during a re-charge or floating conditions, the UPS may shut down unexpectedly, which may compromise the reliability of the UPS. The intermittent charging controlled by certain embodiments of a battery module system as disclosed herein is beneficial in that the series-connected battery modules are more balanced over time, over-charging of the battery modules is prevented, different chargers exhibiting different end-of-charge voltages are allowed, and/or the modules are suitable for any of the existing devices currently using Lead Acid Battery technology.

Aside from the "never shut down" feature, the battery cell balancer embedded in the battery module 100 as described above can perform "self-discharge" independently for each cell during the charging activity when any of the battery cell voltages exceed a preset voltage. The "self-discharge" of the battery cells could terminate the OC conditions (if triggered), and a new charging activity can be resumed after the termination of the OC conditions. One can thus observe an intermittent charging behavior exhibited by certain embodiments of the battery module system comprising the battery modules as disclosed herein. The battery module controlled intermittent charging behavior not only helps in creating a battery cell balanced condition ready for delivering the maximum capacity of the battery module system, but also prevents the battery modules from being over charged, which implies the control of end-of-charge voltage for a charger device become unimportant or not necessary to control. Nonetheless, the battery module controlled intermittent charging mechanism of certain embodiments of a battery module system makes the battery modules suitable for any of the existing devices currently using Lead Acid Batteries.

In some embodiments, the relay used for the control system 120 (e.g., 120A, 120B, 120C) shown in FIGS. 1-2C may be embodied as a latching relay, solid state relay, or any other types of relay that can perform the current cut-off function. The diode of the control system 120 (e.g., 120A, 120B, or 120C) as shown in FIGS. 1-2C may be embodied as any off-the-shelf diode that enables a mono-directional current flow. The relay and diode of the control system 120 should be able to be integrated in parallel for performing mono-directional current flow after it performs the cut-off triggered by OC/OD conditions.

Figure 3A:
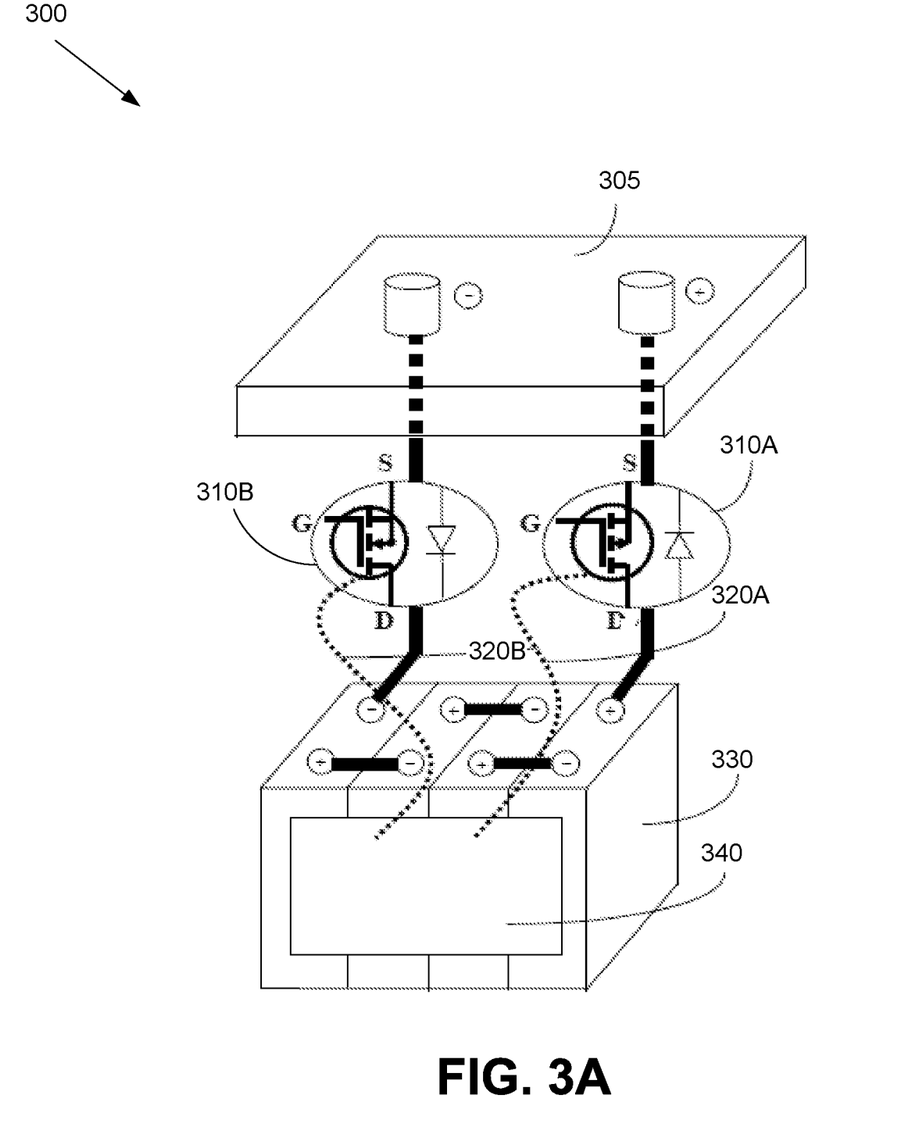
FIG. 3A is a schematic diagram that illustrates another embodiment of an example battery module system.
Figure 3B:
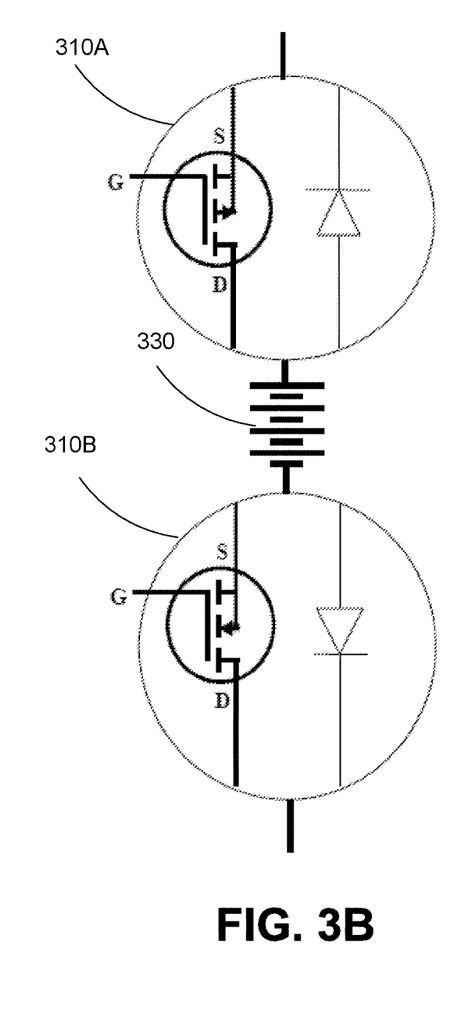
FIG. 3B is a schematic diagram that illustrates an example configuration for the control system of FIG. 3A.

However, the control system 120 depicted in FIGS. 1-2C need not be limited to a relay and a diode configuration. In some embodiments, one or more devices performing a similar function of the diode and relay combination may be used. For instance, a parallel arrangement of a diode and a transistor may be used, or a power transistor may be used. Referring to FIG. 3A, shown is the use of a metal-oxide semiconductor, field-effect transistor (MOSFET) and diode being integrated in parallel for replacing the combination of a latching relay and a diode for a control system. In particular, FIG. 3A shows an embodiment of an example battery module 300 comprising a battery module top 305, control system 310 (310A, 310B), connection cables 320A, 320B from a PCB 340, comprising OC/OD circuitry and balancing circuitry similar to that described above for FIG. 1, to the control system 310, and a battery cell set 330 based on a lithium-ion based technology (e.g., LFPO batteries, though other types of lithium-ion based technology may be used as described above). The control system 310 of FIG. 3A illustrates a P-channel MOSFET (for 310A) and N-channel MOSFET (for 310B) being implemented as replacements for the respective relays used in the OC apparatus 120A and the OD apparatus 120B shown in FIGS. 2A and 2B, respectively. FIG. 3B is an expanded schematic of the P-channel MOSFET plus diode and N-channel MOSFET plus diode for the control system 310 (e.g., 310A, 310B) being connected on the positive side and negative side, respectively, of the battery cell set 330. Note that, though control systems 310A and 310B are illustrated as packaged in the same system (for both OC/OD functionality), in some embodiments, each may be implemented individually in some embodiments (e.g., implemented in the battery for OC only, OD only).

Figure 4:
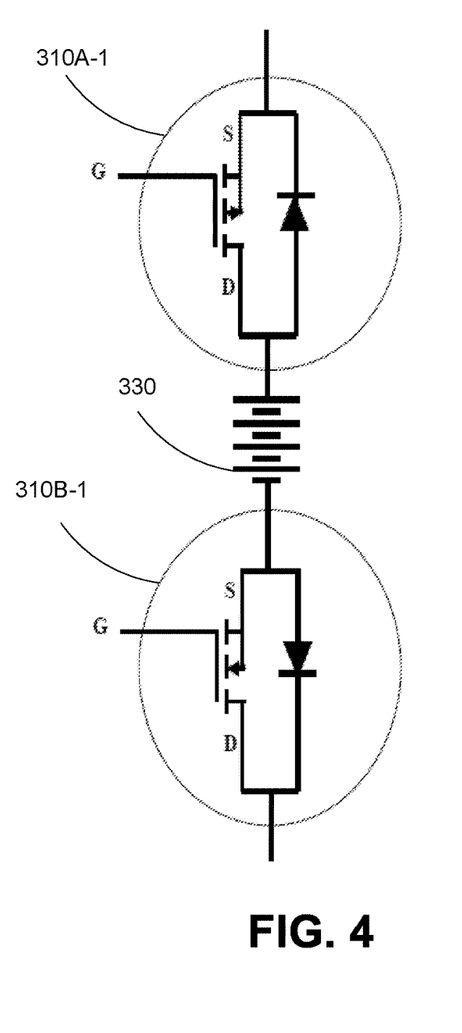
FIG. 4 is a schematic diagram that illustrates an example configuration for the control system of FIG. 3A.

FIG. 4 is yet another example using a control system 310A-1, using a P-channel Power MOSFET, and a control system 310B-1, using an N-channel Power MOSFET, for replacing the P-channel MOSFET plus diode and N-channel MOSFET plus diode shown in FIG. 3B. again, in some embodiments, the components 310A-1, 310B-1 are shown implemented in the same package, though can individually be implemented (e.g., one without the other) in some embodiments depending on, say, the application.

Note that, though MOSFETs (and power MOSFETs) are illustrated in FIGS. 3A-4 (alone or in combination with a diode), it should be appreciated by one having ordinary skill in the art, in the context of the present disclosure, that other transistors and/or electronic components, alone or in combination, that perform the same or similar functionality may be used and hence are contemplated to be within the scope of the disclosure.

From the description above, it is note worthy that the control system 120 (or 310) providing the mono-directional current flow control functionality as described herein may be embodied in any form with different components (e.g., relay plus diode, MOSFET plus diode, or just a Power MOSFET), and should be placed on either the positive end of the battery cell set, the negative end of the battery cell set, or on both ends (e.g., for OC and OD monitoring functionality) when appropriate, thus making the battery module system ideal for replacing the Lead Acid Batteries.

Other than the choices of components for the control system 120 (or 310), the cell balancer embedded in each of the battery cells can be as disclosed in U.S. Pat. No. 7,777,451, incorporated herein by reference in its entirety, or any other types of balancers that are used in equalizing the battery cells. The OC/OD determinations can be based on voltages preset for each of the battery cells (e.g., 4.2V for OC, 2.0 V for OD), or the overall battery module voltage (e.g., 14 V for OC, 10.5V for OD for a four-cells-in-series LFPO battery module), or the combined conditions. One having ordinary skill in the art should understand, in the context of the present disclosure, that the OC and OD conditions disclosed above can be proportional to the number of battery cells in series.

It is noted that the battery module shown in the present invention could be freely seriesed or paralleled to form a battery system for replacing the existing battery system comprises Lead Acid Batteries.

Figure 5:
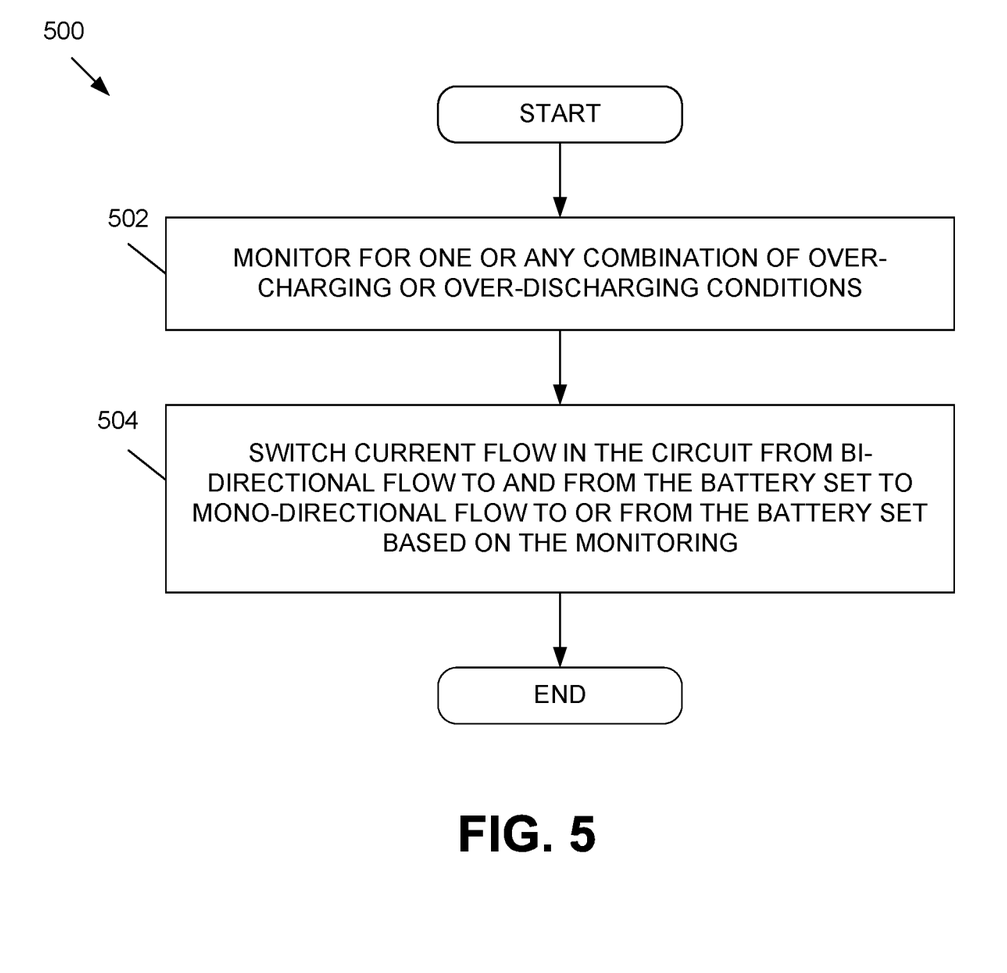
FIG. 5 is a flow diagram that illustrates an embodiment of an example battery module method.

In view of the above description, it should be appreciated that one embodiment of a battery module method (e.g., a control method for a lithium-ion based battery circuit comprising a battery set having plural battery cells), depicted in FIG. 5, and denoted as method 500, comprises: monitoring for one or any combination of over-charging or over-discharging conditions (502); and switching current flow in the circuit from bi-directional flow to and from the battery set to mono-directional flow to or from the battery set based on the monitoring (504). The monitoring may be based on the OC/OD determinations set forth in the previous paragraph.

Any process descriptions or blocks in flow diagrams should be understood as representing steps in the process implemented by an embodiment of a battery module system, and alternate implementations are included within the scope of the embodiments in which functions may be added to or altered from that shown or discussed in conjunction with FIG. 5, including substantially concurrently, depending on the functionality involved, as would be understood by those reasonably skilled in the art of the present disclosure.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the systems and methods have been described with reference to the example embodiments illustrated in the attached figures, it is noted that equivalents may be employed and substitutions made herein without departing from the scope of the disclosure as protected by the following claims. Any reference signs in the claims should not be construed as limiting the scope.

The invention claimed is:

1. A control method for a lithium-ion based battery circuit comprising a battery set having plural battery cells, the method comprising:
    monitoring for one or any combination of over-charging or over-discharging conditions; and
    switching current flow in the circuit from bi-directional flow to and from the battery set to mono-directional flow to or from the battery set, while preventing a shutdown of the battery set from ever occurring, based on the monitoring.

2. The method of claim 1, wherein the switching is implemented on a positive side of the battery set or on a negative side of the battery set.

3. The method of claim 1, wherein each of the plural battery cells of the battery set comprises a lithium-ion based battery cell.

4. The method of claim 1, wherein based on an over-charging condition, enabling a discharge function to a load, based on the mono-directional flow from the battery set, until each voltage across the respective battery cells or a collective voltage across the battery cells are within a predetermined range, after which, enabling the bi-directional flow.

5. The method of claim 1, wherein based on an over-discharging condition, enabling a charging function, based on the mono-directional flow from a charging device to the battery set, until each voltage across the respective battery cells or a collective voltage across the battery cells are within a predetermined range, after which, enabling the bi-directional flow.

6. The method of claim 1, wherein each of the battery cells comprises a resistor, wherein based on an over-charging condition, the resistor of each of the battery cells is configured to enable a discharge function, based on each of the voltages of the respective battery cells exceeding a preset voltage and based on the mono-directional flow from the battery set, until each voltage across the respective battery cells or a collective voltage across the battery cells are within a predetermined range or after a predetermined time period, after which, enabling the bi-directional flow.

7. The method of claim 1, wherein the switching is implemented with a relay in parallel with a diode.

8. The method of claim 1, wherein the switching is implemented with plural pairs of parallel-arranged components, wherein a first pair comprises a first relay in parallel with a first diode, wherein at least a second pair comprises a second relay in parallel with a second diode, the first diode enabling current flow in a direction opposite than the second diode.

9. The method of claim 1, wherein the switching is implemented with one or more transistors in parallel with one or more respective diodes, or implemented with one or more power transistors.

10. The method of claim 1, wherein the switching is implemented on a positive side and a negative side of the battery set.

* * * * *